United States Patent [19]

Lane

[11] Patent Number: 5,454,460
[45] Date of Patent: Oct. 3, 1995

[54] ROLLER ASSEMBLY FOR AGRICULTURAL MACHINES

[76] Inventor: John L. Lane, P.O. Box 488, Greeley, Colo. 80632

[21] Appl. No.: 182,577

[22] Filed: Jan. 18, 1994

[51] Int. Cl.⁶ .................................................. B65G 13/00
[52] U.S. Cl. ............................................. 193/37; 193/35 R
[58] Field of Search ..................... 193/35 R, 37; 198/780

[56] References Cited

U.S. PATENT DOCUMENTS

| | | | |
|---|---|---|---|
| 2,648,577 | 8/1953 | Watt | 193/37 X |
| 2,703,165 | 3/1955 | Couser | 193/37 |
| 3,106,249 | 10/1963 | Zachery | 171/14 |
| 3,416,638 | 12/1968 | Buck | 193/37 |
| 3,426,119 | 2/1969 | Chapman et al. | 264/230 |
| 3,708,844 | 1/1973 | Rawson | 193/35 R X |
| 3,711,913 | 1/1973 | Galeone et al. | 29/148.4 D |
| 4,006,810 | 2/1977 | Kornylak | 193/37 |
| 4,011,938 | 3/1977 | Kain | 198/824 |
| 4,668,110 | 5/1987 | Egeto et al. | 193/37 X |
| 4,852,230 | 8/1989 | Yu | 29/148.4 D |
| 5,022,132 | 6/1991 | Valster et al. | 193/37 X |
| 5,103,955 | 4/1992 | Toye | 193/35 R |
| 5,110,382 | 5/1992 | Terry et al. | 156/77 |

FOREIGN PATENT DOCUMENTS 0240941 10/1957 Australia ................................. 193/37

Primary Examiner—James R. Bidwell
Attorney, Agent, or Firm—Baker, Maxham, Jester & Meador

[57] ABSTRACT

A roller assembly having modular replaceable and interchangeable components for use in agricultural machines having endless conveyors with edges which pass over or under roller assemblies. The roller assembly has a long wearing resilient outer tire which is secured to a hub assembly. The hub assembly is comprised of two hub members having central bores forming a cavity within which resides bearings. The bearings are selectively sealed with a resilient washer element. A spacer on each respective end of the roller assembly is optionally added to accommodate mounting to a machine frame and for repair. An optional flange attaches on one side of the roller to help align the conveyor. The modular components may be packaged to provide a kit of parts usable for modular assembly, repair, or replacement purposes.

38 Claims, 2 Drawing Sheets

5,454,460

ROLLER ASSEMBLY FOR AGRICULTURAL MACHINES

BACKGROUND OF THE INVENTION

1. Field of the Invention

This invention is directed generally toward an apparatus for agricultural machines, and more particularly, to a roller assembly having interchangeable modular components such that repair and replacement of any of the parts is achievable instead of requiring replacement of an entire roller assembly.

2. Description of the Related Art

Agricultural machines, such as harvesting and crop processing machines, are well known in the art. A particular type of harvester, to which the present invention relates, performs in an automatic mode to dig crops, such as potatoes or sugar beets, from the soil. Such harvesting machinery also separates the crop from it's vines, dirt, stones and other unwanted items retrieved in the digging operation. This is accomplished by moving the crop components over a distance through the machine by means of an endless belt or chain comprised of interconnected closely spaced rods, allowing the undesirable material to drop while the harvested crop remains on the moving belt. The rods are typically attached to some sort of endless band of material which passes over or under roller assemblies. Thus the crop travels along the machine on the rods in a typical fashion as is well known with harvesting machines having conveyor belts.

An example of such an agricultural harvesting machine is described in U.S. Pat. No. 3,106,249 to Zachery. This patent describes various improvements to an agricultural machine having conveyor means to deliver potatoes to a receiving area. A typical roller assembly for use in agricultural machinery is shown in the patent as being of unified construction. A disadvantage of such unified construction is that the entire roller, including hub and bearings, must be replaced when the outer surface in contact with the interconnected ends of the conveyor chain becomes worn.

It has been the practice in the agricultural industry to manufacture different rollers for specific needs. The most common roller used for harvesting tomatoes, potatoes, and other root crops such as onions, carrots or sugar beets, has an external diameter of 3 ½". Four common roller configurations available from manufacturers with this diameter are either flat or have various size flanges which are integrally attached to the roller. Each of the four rollers, although common in outer diameter, is a separate roller assembly targeted toward a separate need. Typical flange diameters are 5", 6 ½" and 8". A 5" diameter roller is also common. It might be made with an 8" or a 9 ½" flange. The flanges are intended to prevent the sides of the conveyor chain from coming in contact with the frame of the machine and possibly damaging the chain and the machine.

One problem with the prior art rollers, alluded to above with respect to the Zachery patent, relates to the fact that they are unitary. This means that the entire roller must be replaced if the external surface, the bearings, or any other part becomes worn or inoperative. The old one is simply discarded, resulting in unnecessary waste.

Additionally, the requirement of maintaining inventories of many separate unitary rollers to meet various agricultural machine requirements takes up space and requires a substantial investment.

SUMMARY OF THE INVENTION

Broadly speaking, this invention concerns a roller assembly having modular replaceable components for use in agricultural machines having an endless conveyor chain which passes over roller assemblies on its way through the machine. The roller assembly comprises a rubber or hard plastic outer tire which is secured on metal or thermoplastic inner axial hub members. The inner axial hub members each have a central bore in which bearing members are seated. The bearings may be further sealed with a resilient seal washer on either outer end of the bearings. A spacer may be added to the roller assembly to space the roller properly to accommodate the components of the agricultural harvesting machine and to secure the sealing washers in place. The roller assembly is adapted to receive a bolt member through a central bore of the bearing member to attach the roller assembly to the agricultural machine. Another spacer member may be placed between the bolt head and an axial hub member to make the bolt head accessible for ease of removal of the roller assembly from the machine to facilitate repair. An optional flange removably attaches on one side of the roller to help align the endless conveyor belt or chain. Characteristics of such a flange have been set out above.

A primary advantage provided by the present invention is that any of the parts can be replaced without having to replace unworn parts. A high wear, but inexpensive part, such as the tire, may be replaced while a relatively expensive part, such as the bearing assembly, may be reused repeatedly. Another advantage provided by the present invention is that various sized parts are interchangeable with other parts so the invention can advantageously be a kit of parts for selective assembly by the user. For instance, tires of varying outer diameter may be received on an identical pair of inner axial hub members. Alternatively, inner hub members may be of varying axial dimensions which allows for tires of varying axial dimensions, as well as for different modular combinations of bearings. The modular components impart an ability to interchange parts, in turn allowing for customization of a roller assembly to meet the needs of a specific agricultural environment while substantially reducing the investment tied up in rollers. Replacement parts may be maintained in the proportions that they normally wear and need replacement.

BRIEF DESCRIPTION OF THE DRAWING

The objects, advantages and features of the present invention will be more clearly understood by reference to the following detailed disclosure when read in conjunction with the accompanying drawing, in which.

DETAILED DESCRIPTION OF THE PREFERRED EMBODIMENTS

Figure 1:
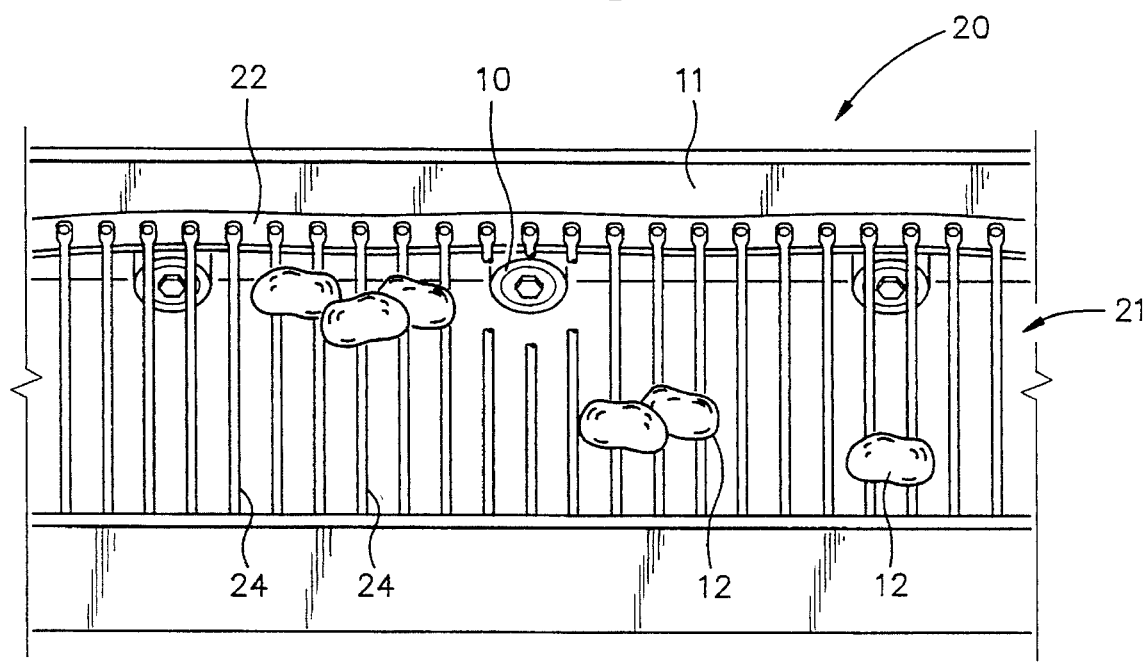
FIG. 1 is an oblique perspective view of a portion of an agricultural harvesting machine showing rollers of the present invention secured thereto.

Referring now to FIG. 1, a portion of agricultural machine 20 is shown with roller assemblies 10 attached to machine frame member 11. Machine 20 has endless conveyor chain 21 comprised of a continuous band of material 22, such as canvas, that passes over or under roller assemblies 10 as the conveyor travels through the machine. Agricultural crops, such as potatoes 12, are supported by rods 24 as the conveyor moves along, guided by rollers 10. Meanwhile dirt, stones and trash fall through between the rods. Harvesting machines, such as machine 20, are well known, as well as are rollers needed to support the endless conveyor belt by means of which crops are transported. While this belt shows an edge band to which the rods are secured, many such conveyors are composed of the rods only, with the ends curled and interconnected.

By contrast with prior art roller assemblies for such machines which have been of unitary construction, roller assembly 10 is comprised of modular components. An important advantage of the present invention is that separate components may be replaced, rather than replacing an entire roller assembly unit. Thus, the life of a roller assembly in an agricultural machine can be extended by replacing worn parts, rather than an entire assembly unit. A tire element can be replaced for a fraction of the cost of an entire new roller assembly.

Figure 2:
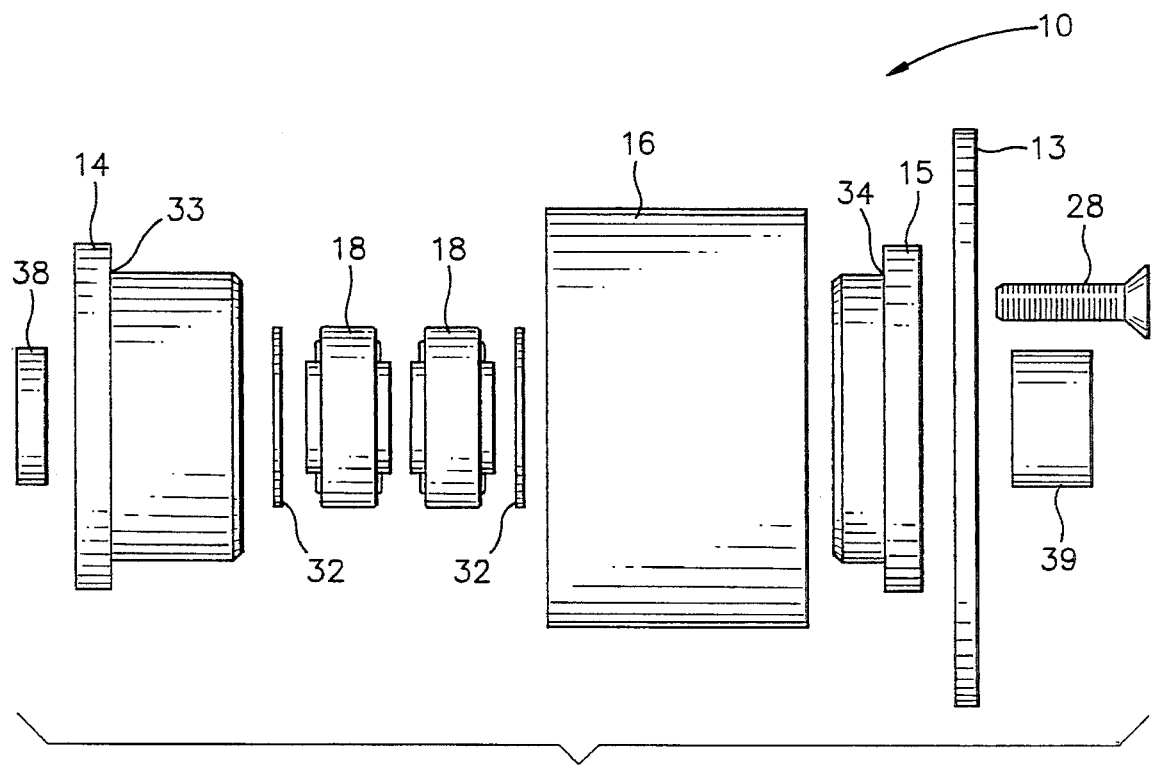
FIG. 2 is an exploded side view of a preferred embodiment of the present invention.
Figure 3:
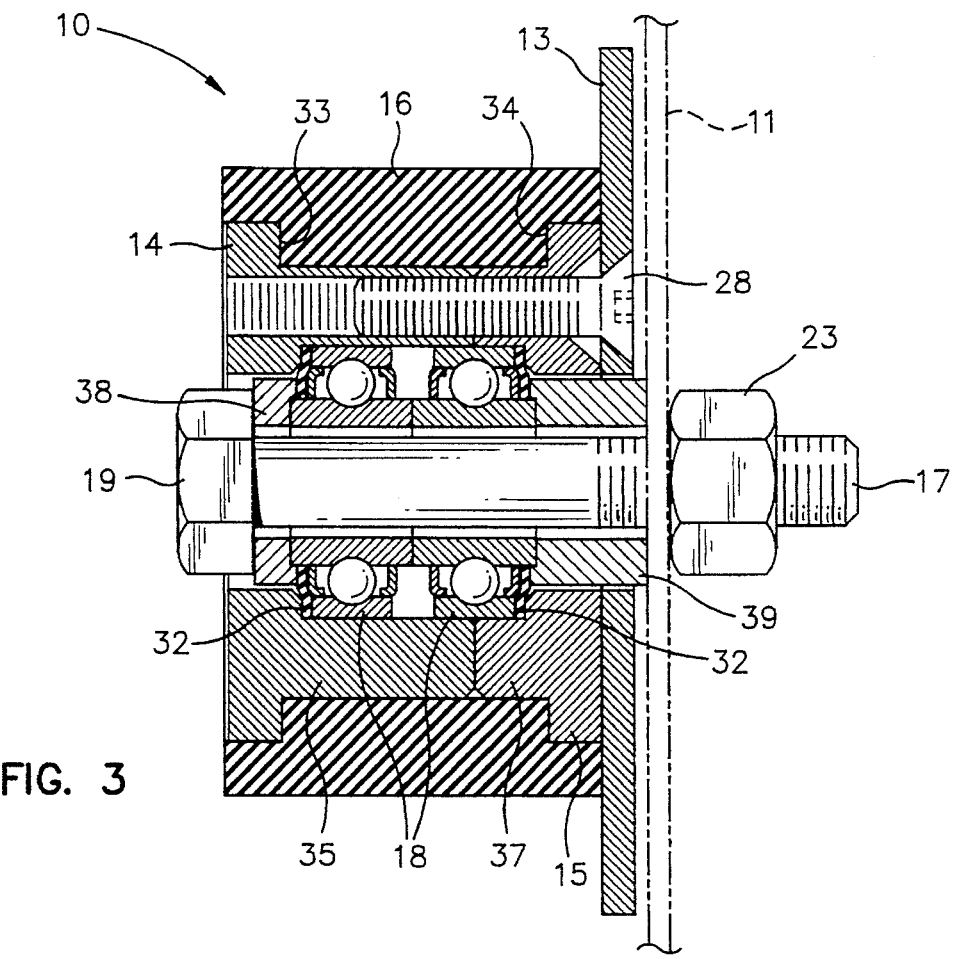
FIG. 3 is a sectional view of the preferred embodiment of FIG. 2 in assembled form.

Referring now to FIGS. 2 and 3, a preferred embodiment of the invention is shown. Roller assembly 10 is comprised of annular cylindrical tire 16, which is mounted on first hub member 14. Second inner axial hub member 15 fits in the other end of tire 16. Bolt 28, of which there are several, preferably three, secure hub members 14 and 15 together, thereby compressively securing tire 16 immovably to the hub. Annular shoulder 33 on hub member 14 and similar shoulder 34 on hub member 15 engage similar shoulders on the inner surface of tire 16. The compressive force on tire 16 holds the tire in place and prevents its rotation with respect to the hub. The tire is preferably composed of a long wearing material such as rubber, but may also be composed of plastic. A suitable long lasting plastic is an ultra high molecular weight (UHMW) material. Each hub member is preferably made of steel, but as shown in an alternative embodiment, it may also be made of a lighter and less expensive thermoplastic composite, such as Celcon, a trademark of Celanese, or Delrin, a trademark of Du Pont.

Central bores 35 and 37 of the first and second hub elements, respectively, provide a cavity within which are secured cylindrical bearing members 18. Annular sealing washers 32 are selectively provided which cover the annular outer ends of the bearings, thereby sealing them from contamination. Not only do washers 32 provide a seal of the bearings, they also, because they are compressible, accommodate the manufacturing tolerances of the hub elements and the bearings. This is important because the tolerances of the hub elements and the circular sides of the bearings can be cumulative.

Optional flange 13, having a larger outer diameter than tire 16, is used to hold the edge of conveyor 21 in place so it does not hit the side of machine 20.

Referring again to FIG. 3. Bolt 17, having head 19, passes through roller assembly 10 and is used to secure the roller assembly to machine frame member 11 by means of nut 23. Bolt head 17 is made accessible by annular spacer 38, which seats on the outer face of the bearing members. Annular spacer 39 on the end of the roller proximate to machine frame member 11 serves to space the roller assembly from machine itself. Each spacer further aids in the sealing of the bearing in the roller assembly. The spacers may be made of steel or other metal, or a hard plastic composite.

Figure 4:
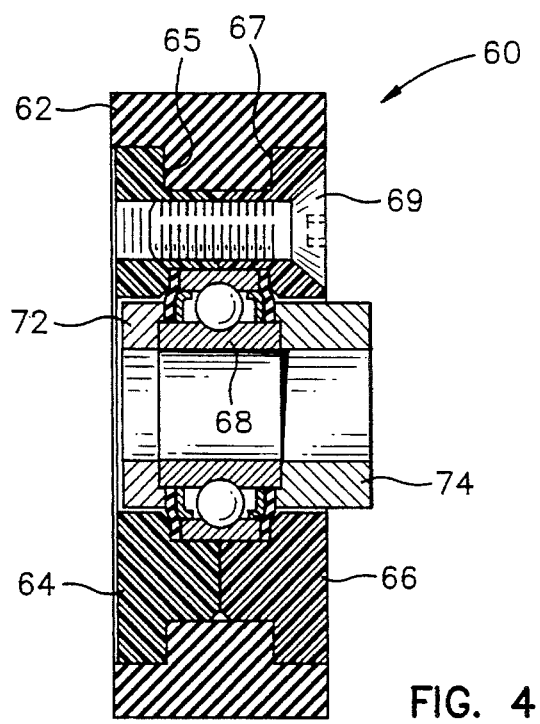
FIG. 4 is a sectional view of an assembled alternative embodiment of the present invention.

FIG. 4 shows an alternative embodiment of the present invention. Roller assembly 60 has first axial hub member 64 and second axial hub member 66, which are shown to be composed of plastic, preferably a thermoplastic composite. To meet specific machine needs, hubs 64 and 66 are axially shorter than hubs 14 and 15 of the FIGS. 2 and 3 embodiment. This is designed for narrower tire 62. Mating shoulders of tire 62 are engaged by inner annular shoulders 65 and 67 of hub members 64 and 66, respectively. The compression method of supporting tire 62 is similar to that of the embodiment previously described, with bolts 69 holding all of the elements of the roller assembly together. No flange is shown in FIG. 4, because such a flange to help maintain stability of the endless conveyor belt is optional. Spacers 72 and 74 serve identical functions as spacers 38 and 39, respectively. A bolt, not shown, may also be used as in the first preferred embodiment to secure the roller to the wall of a machine.

It may be apparent from the teaching of the alternative embodiment shown in FIG. 4 that various configurations are possible. Thus, an additional advantage offered by the present invention is the ability to interchange basic components among various roller assembly embodiments, such as roller assembly 10, having similar basic components but with various configurations. The same basic components may be grouped together and packaged separately from a roller assembly. Such modular kits of parts allow for the ability to repair, assemble and disassemble roller assembles with separate roller components.

Three different size hub elements are shown. Hub element 14 is axially longer than hub element 15. Hub elements 64 and 66 are identical and shorter axially than hub element 15. Note that the separation line between central cylinders 35 and 37 falls at the axial midpoint of right bearing member 18 in FIG. 3. The same is true of hub elements 64 and 66. This means that roller assemblies for at least three different axial width tires may be assembled from these three hub elements. The tire shown in FIGS. 2 and 3 is a standard 2 ⅛ inch in axial width and 3 ½ inch in diameter. Two of hub elements 15 may be used with a 1 ½ inch axial width tire, another standard size. That assembly would use a single bearing member. The embodiment of FIG. 4 accommodates a 1 ⅛ inch axial width tire, also with a single bearing member. In each roller assembly, the stand offs and bearing members are identical. The diameters of the hub element are the same. The differences lie in the axial lengths of the central cylinders of the hub elements, the axial widths of the tires, and in the external tire and flange diameters. Thus, the modular components impart an ability to interchange parts that, in turn, allows for customization of a roller assembly to meet the needs of a specific agricultural environment or task.

A roller assembly having separate replaceable and interchangeable modular components for use in an agricultural harvesting machine has been shown. While various embodiments have been disclosed, other variations could occur to those skilled in the art in view of the teachings herein. Therefore, it should be understood, the invention is not to be limited in any way except in accordance with the spirit of the appended claims and their equivalents.

What is claimed is:

1. A roller assembly having modular components which are repairable and replaceable for use in agricultural machines having a frame, a plurality of roller assemblies coupled with said frame, wherein said roller assembly is a member of said plurality of roller assemblies, and an endless conveyor with edges which pass over or under said roller assemblies, said roller assembly comprising:

bearing means;

a first axial hub member having a first exterior diameter and being formed with a central bore;

a second axial hub member having said first exterior diameter and being formed with a central bore;

means for removably securing said first hub member to said second hub member to form a hub assembly so as to encompass said bearing means within a cavity formed by said central bores of said first hub member and said second hub member, wherein each said first hub member and said second hub member is formed with an external shoulder which forms a second exterior diameter that is greater than said first exterior diameter, and when said first and second hub members are secured together, each said external shoulder is facing and spaced from each other; and an annular cylindrical tire having an exterior diameter which is greater than said second exterior diameter and further having an interior surface and an exterior surface, wherein said tire is shaped and configured to be removably secured by and between said hub shoulders in an axially compressive manner to prevent rotation of said tire with respect to said hub assembly and so as to secure said tire to said hub assembly, thereby forming said roller assembly, and said tire is further shaped and configured so that said interior surface essentially surrounds said hub assembly and so that said exterior surface of said tire provides a wear surface to contact said edges of said endless conveyor.

2. The roller assembly recited in claim 1, wherein:

said bearing means comprises modular cylindrical bearing members; and said cavity is shaped and configured to receive at least one said bearing member.

3. The roller assembly recited in claim 2, wherein said cavity is shaped and configured to receive two said bearing members.

4. The roller assembly recited in claim 2, and further comprising annular first and second spacer elements axially aligned with and positioned on either side of said bearing member, said spacer elements being at least partially within said respective first and second hub member axial bores.

5. The roller assembly recited in claim 4, and further comprising first and second annular compressible sealing washers between each said spacer element and said bearing member to thereby seal said bearing member from environmental contamination.

6. The roller assembly recited in claim 5, and further comprising a bolt passing axially through said roller assembly, said bolt being adapted to secure said roller assembly to the frame of the agricultural machine, said bolt having a head bearing on one said spacer element, the other said spacer element bearing against the frame, thereby applying compressive forces to said spacer elements and therefore to enhance the sealing function of said sealing washers.

7. The roller assembly recited in claim 1, and further comprising an enlarged flange secured to one of said axial hub members, said flange functioning to stabilize the motion of the conveyor through the machine.

8. The roller assembly recited in claim 1, and further comprising a bolt adapted for attaching said roller assembly to the agricultural machine, said bolt having a radially enlarged head.

9. The roller assembly recited in claim 8, and further comprising a first annular spacer element mounted between said bolt head and said bearing means to provide a seal for said bearing means and to make said bolt head accessible for removal of said roller assembly from the frame.

10. The roller assembly recited in claim 9, and further comprising a second annular spacer element for spacing said roller assembly from the agricultural machine frame, said spacer element also providing a seal for said bearing means.

11. The roller assembly recited in claim 1, wherein said tire is made of long wearing resilient material.

12. The roller assembly recited in claim 1, wherein said first hub member and said second hub member are made of steel.

13. The roller assembly recited in claim 1, wherein said first hub member and said second hub member are made of plastic.

14. A roller assembly having modular components which are repairable and replaceable for use in agricultural machines having a frame, a plurality of roller assemblies coupled with said frame, wherein said roller assembly is a member of said plurality of roller assemblies, and an endless conveyor with edges which pass over or under said roller assemblies, said roller assembly comprising:

bearing means;

a first axial hub member having a first exterior diameter and being formed with a central bore;

a second axial hub member having said first exterior diameter and being formed with a central bore;

means for removably securing said first hub member to said second hub member to form a hub assembly so as to encompass said bearing means within a cavity formed by said central bores of said first hub member and said second hub member, wherein each said first hub member and said second hub member is formed with an external shoulder which forms a second exterior diameter that is greater than said first exterior diameter, and when said first and second hub members are secured together, each said external shoulder is facing and spaced from each other; and an annular cylindrical tire having an exterior diameter which is greater than said second exterior diameter and further having an interior surface and an exterior surface;

an annular flange having a larger exterior diameter than said tire exterior diameter and adapted to fit against said tire, wherein said tire is shaped and configured to be removably secured by and between said hub shoulders in an axially compressive manner to prevent rotation of said tire with respect to said hub assembly and so as to secure said tire and said annular flange to said hub assembly, thereby forming said roller assembly, and said tire is further shaped and configured so that said interior surface essentially surrounds said hub assembly and so that said exterior surface of said tire provides a wear surface to contact said edges of said endless conveyor.

15. The roller assembly recited in claim 14, said bearing means comprises modular cylindrical bearing members; and said cavity is shaped and configured to receive at least one said bearing member.

16. The roller assembly recited in claim 15, wherein said cavity is shaped and configured to receive two said bearing members.

17. The roller assembly recited in claim 15, and further comprising annular first and second spacer elements axially aligned with and positioned on either side of said bearing member, said spacer elements being at least partially within said respective first and second hub member axial bores.

18. The roller assembly recited in claim 17, and further comprising first and second annular compressible sealing washers between each said spacer element and said bearing member to thereby seal said bearing member from enviromnental contamination.

19. The roller assembly recited in claim 18, and further comprising a bolt passing axially through said roller assembly, said bolt being adapted to secure said roller assembly to the frame of the agricultural machine, said bolt having a head bearing on one said spacer element, the other said spacer element bearing against the frame, thereby applying compressive forces to said spacer elements and therefore to enhance the sealing function of said sealing washers.

20. The roller assembly recited in claim 14, and further comprising a bolt adapted for attaching said roller assembly to the agricultural machine, said bolt having a radially enlarged head.

21. The roller assembly recited in claim 20, and further comprising a first annular spacer element mounted between said bolt head and said bearing means to provide a seal for said bearing means and to make said bolt head accessible for removal of said roller assembly from the frame.

22. The roller assembly recited in claim 21, and further comprising a second annular spacer element for spacing said roller assembly from the agricultural machine frame, said spacer element also providing a seal for said bearing means.

23. A roller assembly having modular components which are repairable and replaceable for use in agricultural machines having a frame, a plurality of roller assemblies coupled with said frame, wherein said roller assembly is a member of said plurality of roller assemblies, and an endless conveyor with edges which pass over or under said roller assemblies, said roller assembly comprising:

bearing means;

a first axial hub member having a first exterior diameter and being formed with a central bore;

a second axial hub member having said first exterior diameter and being formed with a central bore;

at least one annular sealing washer adapted to cover an exposed end of said bearing means; and means for removably securing said first hub member to said second hub member to form a hub assembly so as to encompass said bearing means within a cavity formed by said central bores of said first hub member and said second hub member, wherein each said first hub member and said second hub member is formed with an external shoulder which forms a second exterior diameter that is greater than said first exterior diameter, and when said first and second hub members are secured together, each said external shoulder is facing and spaced from each other; and an annular cylindrical tire having an exterior diameter which is greater than said second exterior diameter and further having an interior surface and an exterior surface;

wherein said tire is shaped and configured to be removably secured by and between said hub shoulders in an axially compressive manner to prevent rotation of said tire with respect to said hub assembly and so as to secure said tire to said hub assembly, thereby forming said roller assembly, and said tire is further shaped and configured so that said interior surface essentially surrounds said hub assembly and so that said exterior surface of said tire provides a wear surface to contact said edges of said endless conveyor.

24. The roller assembly recited in claim 23, wherein:

said bearing means comprises modular cylindrical bearing members; and said cavity is shaped and configured to receive at least one said bearing member.

25. The roller assembly recited in claim 24, wherein said cavity is shaped and configured to receive two said bearing members.

26. The roller assembly recited in claim 24, and further comprising annular first and second spacer elements axially aligned with and positioned on either side of said bearing member, said spacer elements being at least partially within said respective first and second hub member axial bores.

27. The roller assembly recited in claim 26, and further comprising first and second annular compressible sealing washers between each said spacer element and said bearing member to thereby seal said bearing member from environmental contamination.

28. The roller assembly recited in claim 27, and further comprising a bolt passing axially through said roller assembly, said bolt being adapted to secure said roller assembly to the frame of the agricultural machine, said bolt having a head bearing on one said spacer element, the other said spacer element bearing against the frame, thereby applying compressive forces to said spacer elements and therefore to enhance the sealing function of said sealing washers.

29. The roller assembly recited in claim 23, and further comprising an enlarged flange secured to one of said axial hub members, said flange functioning to stabilize the motion of the conveyor through the machine.

30. The roller assembly recited in claim 23, and further comprising a bolt adapted for attaching said roller assembly to the agricultural machine, said bolt having a radially enlarged head.

31. The roller assembly recited in claim 30 and further comprising a first annular spacer element mounted between said bolt head and said bearing means to provide a seal for said bearing means and to make said bolt head accessible for removal of said roller assembly from the frame.

32. The roller assembly recited in claim 31, and further comprising a second annular spacer element for spacing said roller assembly from the agricultural machine frame, said spacer element also providing a seal for said bearing means.

33. A roller assembly having modular components which are repairable and replaceable for use in agricultural machines having a frame, a plurality of roller assemblies coupled with said frame, wherein said roller assembly is a member of said plurality of roller assemblies, and an endless conveyor with edges which pass over or under said roller assemblies, said roller assembly comprising:

an annular cylindrical bearing member;

a first annular axial hub member having a first exterior diameter and an inner annular shoulder forming a second exterior diameter that is greater than the first exterior diameter and a central bore adapted to receive said bearing member;

a second annular axial hub member having said first exterior diameter and an inner annular shoulder forming said second exterior diameter and a central bore adapted to receive said bearing member;

an annular cylindrical tire having an interior surface, an exterior surface, and an outer rim with an exterior diameter greater than said second exterior diameter, a first inner annular shoulder and a second annular shoulder, said tire being adapted to have said first inner shoulder and said second inner shoulder compressed between said inner annular shoulder of said first annular axial hub member and said inner annular shoulder of said second annular axial hub member, respectively; and means for removably securing said first hub member and said second hub member together to encompass said bearing member and to removably secure said tire to said hub members, thereby forming said roller assembly, and said tire is further shaped and configured so that said interior surface essentially surrounds said hub assembly and so that said exterior surface of said tire provides a wear surface to contact said edges of said endless conveyor.

34. The roller assembly recited in claim 33, and further comprising:

an annular flange having a larger diameter than said tire, said flange member being adapted to fit against said outer rim of said tire; and means for securing said flange to at least one of said hub members.

35. The roller assembly recited in claim 33, and further comprising at least one annular sealing washer adapted to cover an exposed end of said bearing member.

36. A roller assembly kit having component parts capable of being assembled in the field for providing a roller for guiding endless conveyors on agricultural machines, said machines having frame members to which roller assemblies are secured by means of a bolt, said kit comprising the combination of:

a plurality of axial hub members each having an exterior cylindrical surface and a central bore therethrough shaped and configured to form a cavity when said two hub members are secured together to form a hub assembly;

a bearing member adapted to be secured within said cavity in said hub assembly;

a cylindrical tire adapted to be secured by said hub members when assembled together to form said hub assembly, said tire having an external diameter larger than said external cylindrical surfaces of said hub members;

a plurality of bolts adapted to secure said hub members together when coupled with said bearing member and said tire;

a flange having a diameter larger than said tire, said flange adapted to be selectively fixed to said roller assembly by said bolts;

resilient sealing washers adapted to be selectively applied to the axial ends of said bearing member within said cavity; and spacer elements adapted to be selectively applied to the axial ends of said hub assembly to accommodate said bolt which, when said roller assembly is secured to said frame member, couples said spacer element to said roller assembly so as to space said roller assembly from said frame member.

37. The kit recited in 36, a wherein said hub members have different axial lengths.

38. The kit recited in claim 36, and further comprising a bolt adapted to secure said roller assembly to said frame member.

* * * * *